No. 730,197. Patented June 2, 1903.

UNITED STATES PATENT OFFICE.

JOKICHI TAKAMINE, OF NEW YORK, N. Y.

PROCESS OF ISOLATING THE ACTIVE PRINCIPLE OF THE SUPRARENAL GLANDS.

SPECIFICATION forming part of Letters Patent No. 730,197, dated June 2, 1903.

Original application filed November 5, 1900, Serial No. 35,546. Divided and this application filed November 26, 1900. Serial No. 37,730. (No specimens.)

*To all whom it may concern:*

Be it known that I, JOKICHI TAKAMINE, a subject of the Emperor of Japan, residing in the city of New York, county and State of New York, have invented certain new and useful Improvements in Processes of Obtaining a New and Useful Product from Suprarenal Glands; and I do hereby declare the following to be a full, clear, and exact description of the invention, such as will enable others skilled in the art to which it appertains to make and use the same.

This invention relates to improvements in processes of producing in a pure, stable, and concentrated form a substance possessing the blood-pressure-raising, hemostatic, and astringent principle of the suprarenal glands. This substance is fully described in my application, Serial No. 138,969, filed January 14, 1903. In another application—viz., Serial No. 35,546, filed November 5, 1900—I have described processes for the production of this substance. My present invention relates to a process described but not specifically claimed in said application.

The process is carried out as follows: In carrying out my invention the clean suprarenal capsules from animals—such as cattle, sheep, &c.—are disintegrated by suitable means. The mass is then mixed with about the same weight of water or other solvent and steeped at a temperature of about 60° to 75° centigrade for the period of about five to ten hours in a suitable vessel to obtain a fluid extract of the glands, preferably avoiding contact with atmospheric air, which can be to a great extent accomplished by a film of fat floating on top of the liquid or may be done by passing a slow current of hydrogen or carbon dioxid into the top part of the vessel. The object of this is to prevent the oxidation of the extract. At the latter part of the steeping the temperature of the mixture may be raised from 85° to 100° centigrade. The mass is now strained, and the residue is pressed to squeeze out as much liquid as possible. The residue thus pressed out is steeped again with the least amount of water to cover the mass for several hours at the same temperature as above. The two extracts thus obtained are mixed and the mixture is cooled rapidly and the solidified fat removed. The liquid is now evaporated at a low temperature, preferably in a vacuum-pan, admitting, if necessary, a small quantity of hydrogen or carbon dioxid to replace air and to prevent oxidation. The liquid is evaporated until it becomes one-fifth to one-seventh of the original volume. To this concentrated solution two to three times its own volume of alcohol is added, so that the mixture will contain about sixty per cent. of alcohol, by volume. This addition of alcohol will precipitate non-active bodies, such as albumenoids, phosphates, and other mineral salts. It is then filtered and the filtrate distilled under vacuum to separate the alcohol, which is condensed and recovered in a suitable manner. The liquid is thus concentrated to such a degree that its specific gravity becomes 1.05 to 1.15, and fixed caustic alkali of about thirty-per-cent. strength (hydrate of sodium, potassium, calcium, barium, or the like) is added gradually and carefully, taking due precaution not to overheat the liquid, until the mixture shows a strong alkaline reaction. Carbon dioxid is then passed into the solution, and the product will be deposited in the form of white silky microcrystals. The carbon dioxid is passed until no more precipitate is formed. The crystalline precipitate is filtered and washed with water and alcohol and dried. In order to further purify the substance, it may be dissolved in the least possible amount of weak acid, such as acetic acid or hydrochloric acid. The solution is then filtered, if necessary, and caustic ammonia or alkaline carbonates are added, so as to make the solution strongly alkaline. The substance will then crystallize out in much purer form than before, being practically free from inorganic matter. This process of recrystallization may be repeated until the substance becomes quite pure, or the crude substance may be dissolved in the least possible amount of weak caustic alkali, filtered, if necessary, and carbon dioxid then passed into the solution, thereby forming a crystalline precipitate of the substance, this recrystallization being repeated, if desired.

During the above-described manipulations oxidation of the substance by the absorption of oxygen from the air must be avoided as far as possible, due precautions being taken for that purpose.

In refining the material by the use of either acid or alkali I prefer after dissolving it in such acid or alkali to add strong alcohol in the proportion of from two to ten times its own volume to precipitate the mineral impurities contained therein. The liquid is then filtered, and to the clear filtrate about one-half its own volume of ether is preferably added, this precipitating dark-brown foreign matters, chiefly consisting of coloring-matters, which are then removed by filtration. The filtrate is then neutralized with alkaline carbonates or ammonia or suitable alkaline substances if acid has been employed or with an acid reagent if the solution has been effected with alkali, and the substance is thereby precipitated. In either method of purification the crystalline precipitate is filtered, washed with water and alcohol, and dried.

Certain steps or modifications of the process above described not specifically claimed herein are claimed in my application, Serial No. 30,729, of even date herewith.

Having thus described my invention, the following is what I claim as new therein and desire to secure by Letters Patent:

1. The process of obtaining a product from suprarenal glands, which consists in preparing a fluid extract of said glands, treating said extract with a precipitant for the non-active bodies, removing the preciptate formed, treating the residue with alkali, then treating said residue with carbon dioxid to precipitate the product.

2. The process of obtaining a product of the suprarenal glands which consists in extracting the glands with water, treating said extract with a precipitant for the non-active bodies, removing the precipitate formed, treating the residue with alkali, then treating said residue with carbon dioxid to precipitate the product.

3. The process of obtaining a product of the suprarenal glands, which consists in concentrating an aqueous extract of the fresh gland, adding alcohol to said extract to precipitate inert albuminoids and mineral matters, evaporating the alcohol and water to further concentrate the liquid, then adding a solution of fixed caustic alkali and subjecting the liquid to the action of carbon dioxid to precipitate the product, washing the precipitate with suitable liquid, and drying the same, all substantially as set forth.

4. The process of obtaining a product of the suprarenal glands, which consists in steeping in water the comminuted glands at a suitable temperature for a suitable number of hours; separating the soluble matter by filtration and pressing; evaporating the filtrate to such consistency that the inert albuminoid and mineral salts will crystallize out, by addition of a suitable amount of alcohol, adding a suitable amount of alcohol to precipitate the maximum amount of inert albuminoid and mineral matters, evaporating off the alcohol, and further evaporating the liquid to a suitable strength; adding a solution of fixed caustic alkali, and then subjecting the liquid to the action of carbon dioxid in sufficient quantity to counteract the excess of caustic alkali, and allowing the solution to precipitate the product, separating the precipitate, washing with water and alcohol, and drying the product, all substantially as described.

5. The process of obtaining a product of the suprarenal glands, which consists in concentrating an aqueous extract of the fresh gland, adding alcohol to precipitate inert albuminoids and mineral matters, evaporating the alcohol and water to further concentrate the liquid, then adding a solution of fixed caustic alkali and subjecting the liquid to the action of carbon dioxid to precipitate the product, washing the precipitate with suitable liquid, and drying the same, then dissolving this precipitate in an alkaline solution, adding alcohol to precipitate mineral impurities, adding ether to precipitate coloring-matters, and adding a neutralizing agent to precipitate the product, substantially as set forth.

6. The process of refining the product extracted from the suprarenal glands which consists in dissolving said product in a suitable solvent, rendering said solution alkaline, treating said solution with a suitable precipitant to precipitate the product.

7. The process of refining the product of the suprarenal glands which consists in redissolving the precipitate of the product in alkaline solution and then subjecting the solution to the action of carbon dioxid, thereby precipitating the product in purer form.

8. The process of refining the product extracted from the suprarenal glands which consists in dissolving said product in a suitable solvent, adding a precipitant to precipitate the albuminoid and mineral matters therefrom, removing said precipitate, adding to the residue a precipitant for the coloring-matter, removing the precipitated coloring-matter, then precipitating from the purified solution the product in crystalline form by treating the same with a reagent to neutralize the solvent.

9. The process of refining the product of the suprarenal glands which consists in dissolving said product in an alkaline solution, adding alcohol to precipitate the mineral impurities, removing said precipitate, adding ether to the residue to precipitate the coloring-matters, removing said precipitated coloring-matters, then adding a neutralizing agent to the residue to precipitate the product.

JOKICHI TAKAMINE.

Witnesses:
J. GREEN,
A. P. KNIGHT.